United States Patent [19]
Okoshi et al.

[11] Patent Number: 5,146,359
[45] Date of Patent: Sep. 8, 1992

[54] DOUBLE-STAGE PHASE-DIVERSITY RECEIVER

[75] Inventors: Takanori Okoshi, 3-7-7, Sengoku, Bunkyo-ku, Tokyo; Shinji Yamashita, 1-32-20, Daizawa, Setagaya-ku, Tokyo, both of Japan

[73] Assignees: The Furukawa Electric Co., Ltd.; Takanori Okoshi; Shinji Yamashita, all of Tokyo, Japan

[21] Appl. No.: 759,036

[22] Filed: Sep. 5, 1991

Related U.S. Application Data

[63] Continuation of Ser. No. 449,987, Dec. 12, 1989, abandoned.

[30] Foreign Application Priority Data

Jan. 26, 1989 [JP] Japan .................................. 1-17019

[51] Int. Cl.$^5$ .............................................. H04B 10/06
[52] U.S. Cl. .................................... 359/189; 359/191
[58] Field of Search ............... 359/189, 190, 191, 195; 455/137, 139, 315

[56] References Cited

U.S. PATENT DOCUMENTS

| | | | |
|---|---|---|---|
| 3,435,229 | 3/1969 | Buhrer | 359/191 |
| 4,044,247 | 8/1977 | Brown, Jr. | 455/619 |
| 4,506,388 | 3/1985 | Monerie et al. | 455/619 |
| 4,600,303 | 7/1986 | Mogensen | 356/73.1 |

OTHER PUBLICATIONS

Coherent Optical Fiber Communications, KTK Scientific Publishers, Tokyo/Dordrecht 1988, pp. 152–155.
IEEE Journal of Lightwave Technology, vol. LT-4, No. 10 pp. 1556–1562, Oct. 1986.
IEEE Journal of Lightwave Technology, vol. LT-5, No. 1 pp. 44–52, Jan. 1987.
IEEE Journal of Lightwave Technology, vol. LT-5, No. 10 pp. 1466–1478, Oct. 1987.
IEEE Journal of Lightwave Technology, vol. LT-6, No. 11 pp. 1750–1769, Nov. 1988.
Electronics Letters, vol. 12, No. 19, pp. 867–868, Sep. 12, 1985.
IOOC-ECOC'85, Technical Digest (Venice, Italy), pp. 409–412, Oct. 1–4, 1985.
ECOC'88 Technical Digest, (Brighton, U.K.), pp. 147–158, Sep. 11–15, 1988.
Electronics Letters, vol. 24, No. 12, pp. 759–760, Jun. 9, 1988.
IEEE Journal of Lightwave Technology, vol. 6, No. 5, pp. 704–709, May 1988.
ECOC'88 Postdeadline Papers, pp. 57–64, Sep. 11–15, 1988.

Primary Examiner—Edward L. Coles, Sr.
Assistant Examiner—Rafael Bacares
Attorney, Agent, or Firm—Frishauf, Holtz, Goodman & Woodward

[57] ABSTRACT

A double-stage phase-diversity receiver divides one signal into a plurality of signals. These divided signals are mixed with first-stage local oscillation signals having predetermined phase relations to thereby provide a plurality of electrical baseband signals. These electrical signals are up-converted by using second-stage local oscillation signals having a predetermined phase relation. The up-converted IF signals are added, and are then demodulated by a heterodyne scheme.

6 Claims, 8 Drawing Sheets

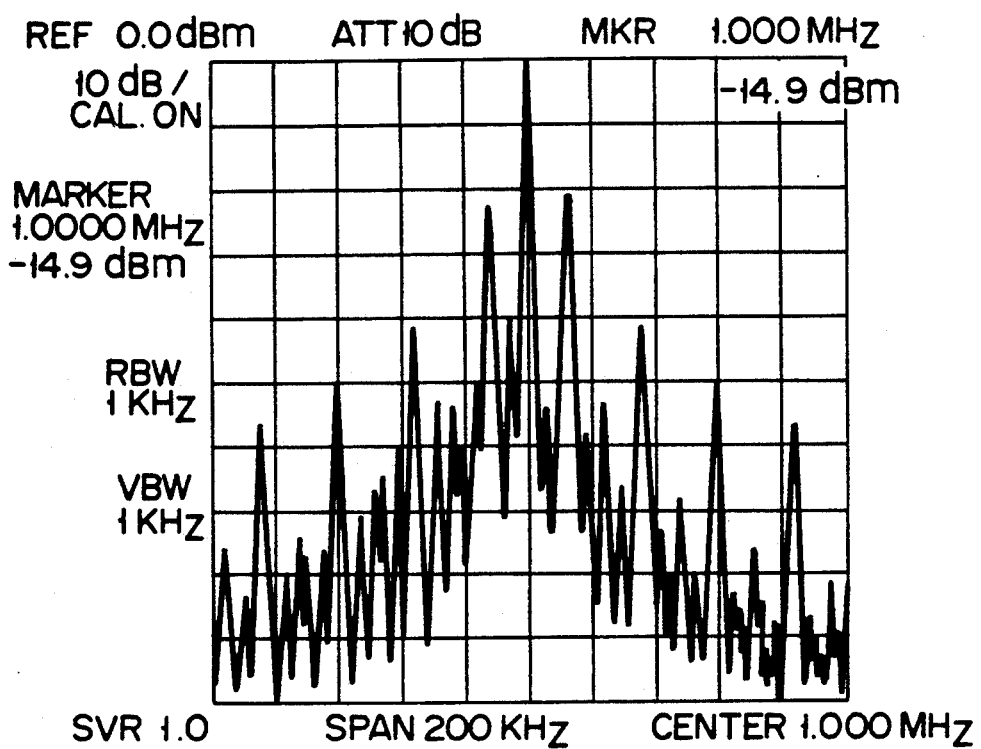
F I G. 11

DOUBLE-STAGE PHASE-DIVERSITY RECEIVER

This application is a continuation of application Ser. No. 07/449,987, filed Dec. 12, 1989, now abandoned.

BACKGROUND OF THE INVENTION

1. Field of the Invention

The present invention relates to a double-stage phase-diversity receiver for use in not only coherent optical fiber communications employing an optical fiber but also, electrical communications, and radio wave communications and light wave communications that use spatial propagation.

2. Description of the Related Art

Receivers used in coherent optical fiber communications are basically classified into two schemes, a heterodyne scheme and a homodyne scheme. In the heterodyne scheme with a very high speed of several Gbits/sec, the intermediate frequency (IF) becomes 10 to 20 GHz, which makes it difficult to realize high-performance receivers due to restriction on the frequency response characteristic of a photodetector or microwave circuit technology. In the homodyne scheme, by way of contrast, although the light source is required to have a narrow spectral width, the above difficulty can be avoided because the optical signal is converted into a baseband signal. In this respect, research on this homodyne scheme has recently been accelerated with improvement of light sources. Further, attention has been paid to a phase-diversity scheme in which the requirements for optical phase stability on laser diodes for use in a transmitter and/or for use in a local oscillator in a receiver are much relaxed. In this scheme, as in well as older homodyne schemes, however, (a) it is not possible to compensate in the receiver the delay distortion produced by group delay of optical fibers, while this compensation is possible in the heterodyne scheme, and (b) it is technically more difficult to realize coherent ASK (Amplitude Shift Keying) or PSK (Phase Shift Keying) demodulators in baseband than in intermediate frequency (IF) range. Of these intrinsic limitations to performance of the phase-diversity scheme, the limitation (b) can be overcome, as recently proposed, by converting baseband signal into an intermediate frequency, before demodulation. Yet no solution has yet been proposed to the first limitation (a).

Silica fiber has the lowest transmission loss in 1.55-μm wavelength band, but in this wavelength band, a relatively large group delay distortion occurs in the signal waveform because of wavelength dispersion. This group delay distortion restricts the transmission speed or the transmission distance particularly in signal transmission at a high speed of several Gbits/sec. As a solution to this shortcoming, dispersion-shifted fibers or dispersion-flattened fibers may be employed to reduce the wavelength dispersion. These optical fibers, however, have higher transmission loss; the former type fibers have a narrow region where the dispersion is negligible and the latter fibers are difficult to manufacture.

SUMMARY OF THE INVENTION

Accordingly, it is an object of the present invention to provide a double-stage phase-diversity receiver which can simultaneously realize the merits of the homodyne scheme and heterodyne scheme, whereby a high-speed signal transmission can be facilitated by compensating the group delay of optical fibers, and utilizing the narrow band property of the homodyne scheme.

According to the present invention, the communication signal is divided into a plurality of divided signals with which a plurality of first-stage local oscillator signals having a predetermined phase relation is mixed to provide a plurality of electrical signals which are up-converted by a plurality of second-stage local oscillator signals having a predetermined phase relation, these up-converted signals are added, and the result of the addition is demodulated similarly as in a heterodyne scheme.

Fronted detection equivalent to that in the homodyne scheme and demodulation similar to that in the heterodyne scheme are attained, with only the merits of both schemes realized, and with the demerits of both schemes are removed.

The narrow band property of the homodyne scheme is retained while the demodulation can permit compensation for the group delay distortion which is originated from the wavelength dispersion of optical fibers similarly as in the heterodyne scheme.

BRIEF DESCRIPTION OF THE DRAWINGS

FIG. 11 is an experimental result in a double-stage phase-diversity radio wave receiver according to the concept of the invention and shows the power spectrum of the added up-converted intermediate frequency signals.

DETAILED DESCRIPTION OF THE PREFERRED EMBODIMENTS

Preferred embodiments will be described below referring to the accompanying drawings.

Figure 1:
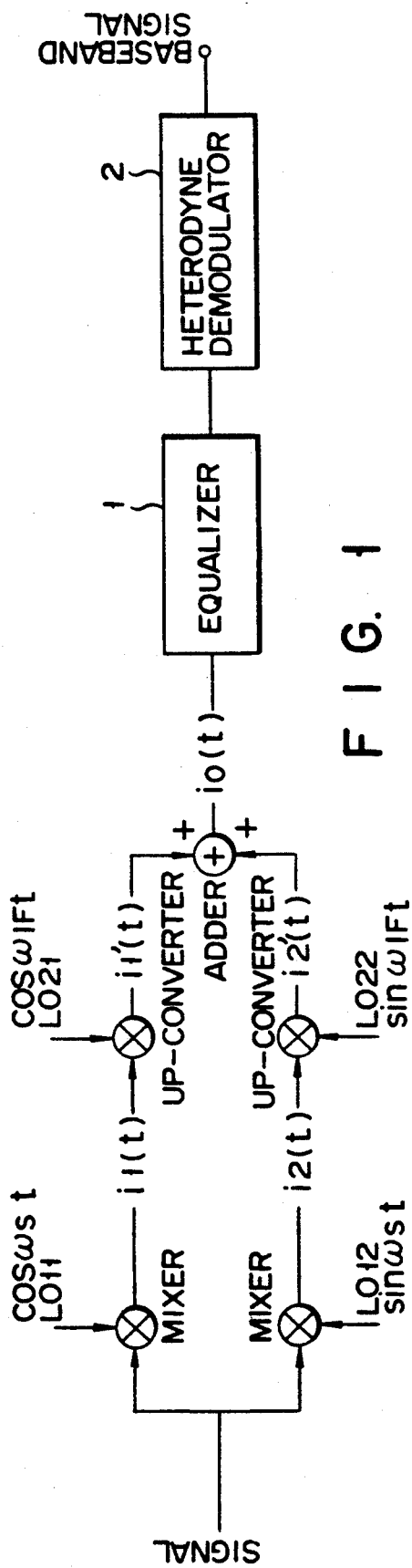
FIG. 1 is a conceptual diagram for explaining the present invention.

FIG. 1 presents a conceptual diagram of a double-stage phase-diversity receiver embodying the present invention. The illustration involves coherent optical fiber communications. When coherent ASK or PSK modulation is considered, a signal light input to the double-stage phase-diversity receiver is expressed by:

$$f(t) = v(t) \cos(\omega_S t + \psi) \quad (1)$$

where $\omega_S$ is an angular frequency of a carrier, and $\psi$ is the phase difference between the carrier and a local oscillation signal, which is constant during a bit interval T (reciprocal of a bit rate).

The signal is divided into two signals with which first-stage local oscillation signals having a phase difference of 90° and an angular frequency $\omega_{LO}$ are mixed at mixers. The mixed signal have currents $i_1(t)$ and $i_2(t)$. These currents are given by the following equations:

$$i_1(t) = Sv(t) \cos(\omega_{OFF} t + \psi) \quad (2)$$

$$i_2(t) = -Sv(t) \sin(\omega_{OFF} t + \psi) \quad (3)$$

where S is a constant representing the mixing efficiency of the mixers and $\omega_{OFF}$ is an offset angular frequency for applying automatic frequency control (AFC). The latter element is given by:

$$\omega_{OFF} = \omega_S - \Psi_{LO}$$

Two electrical baseband signals obtained through above the mixers are amplified if necessary and up-converted by second-stage local oscillator signals having an angular frequency $\omega_{IF}$, and a phase difference of 90° and resulting intermediate frequency (IF). The currents $i_1'(t)$ and $i_2'(t)$ are given by the following equations:

$$i_1'(t) = \frac{1}{2} Sv(t) \cos\{(\omega_{OFF} + \omega_{IF})t + \psi\} + \frac{1}{2} Sv(t) \cos\{(\omega_{OFF} - \omega_{IF})t - \psi\} \quad (4)$$

$$i_2'(t) = \frac{1}{2} Sv(t) \cos\{(\omega_{OFF} + \omega_{IF})t + \psi\} - \frac{1}{2} Sv(t) \cos\{(\omega_{OFF} - \omega_{IF})t - \psi\} \quad (5)$$

These two IF currents are inputs to an adder which in turn outputs an added result $i_O$. This added output $i_O$ is given by:

$$\begin{aligned} I_O(t) &= i_1'(t) + i_2'(t) \\ &= Sv(t) \cos\{(\omega_{OFF} + \omega_{IF})t + \psi\} \end{aligned} \quad (6)$$

The output $i_O(t)$ is exactly the same as the current attained when the signal is subjected to heterodyne detection with the intermediate frequency $\omega_{OFF} + \omega_{IF}$. Therefore, supplying this added output $i_O(t)$ to an equalizer 1 having a predetermined transfer function can permit compensation for the group delay. The compensated result is demodulated by an ordinary heterodyne demodulator 2, which can provide a baseband signal.

Figure 2:
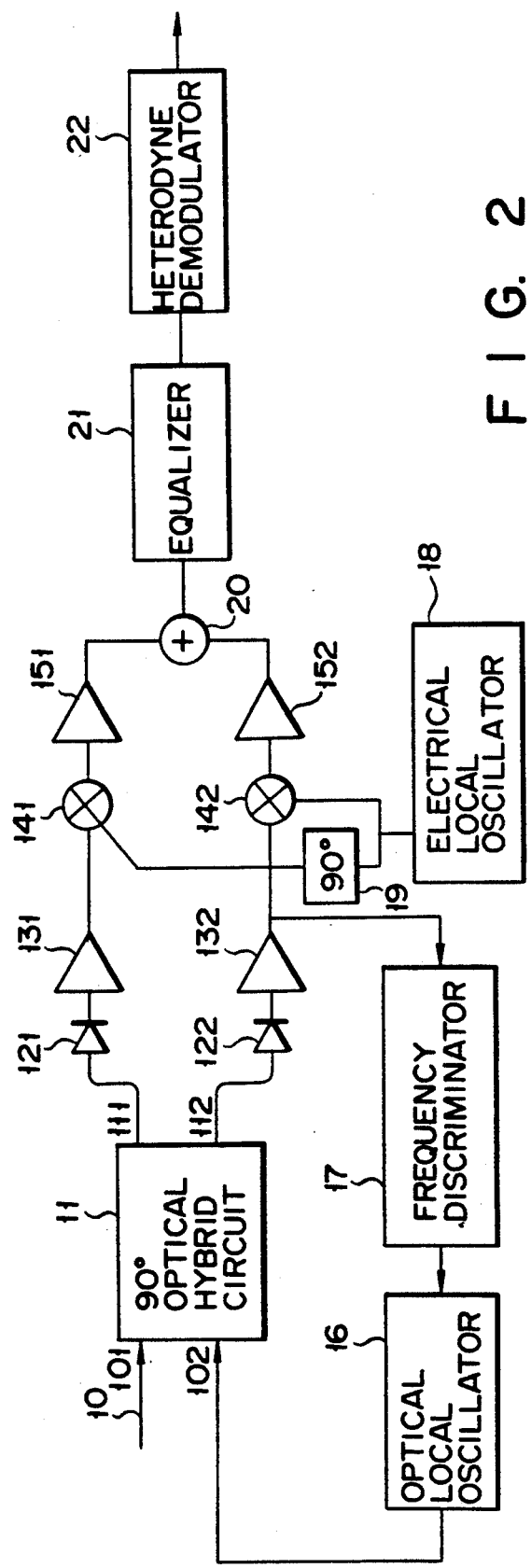
FIG. 2 is a block diagram of a double-stage phase-diversity optical receiver according to the first embodiment of this invention.

FIG. 2 is a block diagram illustrating the first embodiment of the present invention.

Referring to this diagram, numeral 11 denotes an optical hybrid circuit which has two input ports; the first input port receives signal light from an optical fiber 10, and the second input port receives a optical local oscillation signal from an optical local oscillator 16. The optical local oscillation signal from the local oscillator 16 is subjected to frequency control by a frequency lock loop which has a frequency discriminator 17.

The optical hybrid circuit 11 has two output ports from which mixed lights acquired by mixing the signal light with two optical local oscillation signals having a mutual phase difference of 90°. Of the two outputs from the optical hybrid circuit 11, output 111 has a phase delay of 90° as compared with that of the output 112. These outputs are supplied to associated mixers 141 and 142 respectively through a circuit of a photodiode 121 and an amplifier 131 and a circuit of a photodiode 122 and an amplifier 132.

The mixer 141 receives an electrical local oscillation signal from an electrical local oscillator 18, which has its phase delayed by 90° via a phase shifter 19. This electrical local oscillation signal is multiplied by the output of the amplifier 131. The same type mixer 142 receives an electrical local oscillation signal directly from this electrical local oscillator 18. This electrical local oscillation signal is multiplied by the output of the amplifier 132.

The outputs of the mixers 141 and 142 are supplied to an adder 20 respectively through amplifiers 151 and 152, and are added there. The result of the addition is given to an equalizer 21 which serves as a compensating circuit. This equalizer 21, having a predetermined transfer function already set therein, compensates for a delay of the optical fiber 10 by compensating the output signal from the adder 20.

The output of the equalizer 21 is supplied to a heterodyne demodulator 22 for demodulation, and a baseband signal is output from this demodulator 22. With no consideration being given to the group delay of the optical fiber 10, however, the equalizer 21 can be omitted.

Figure 3:
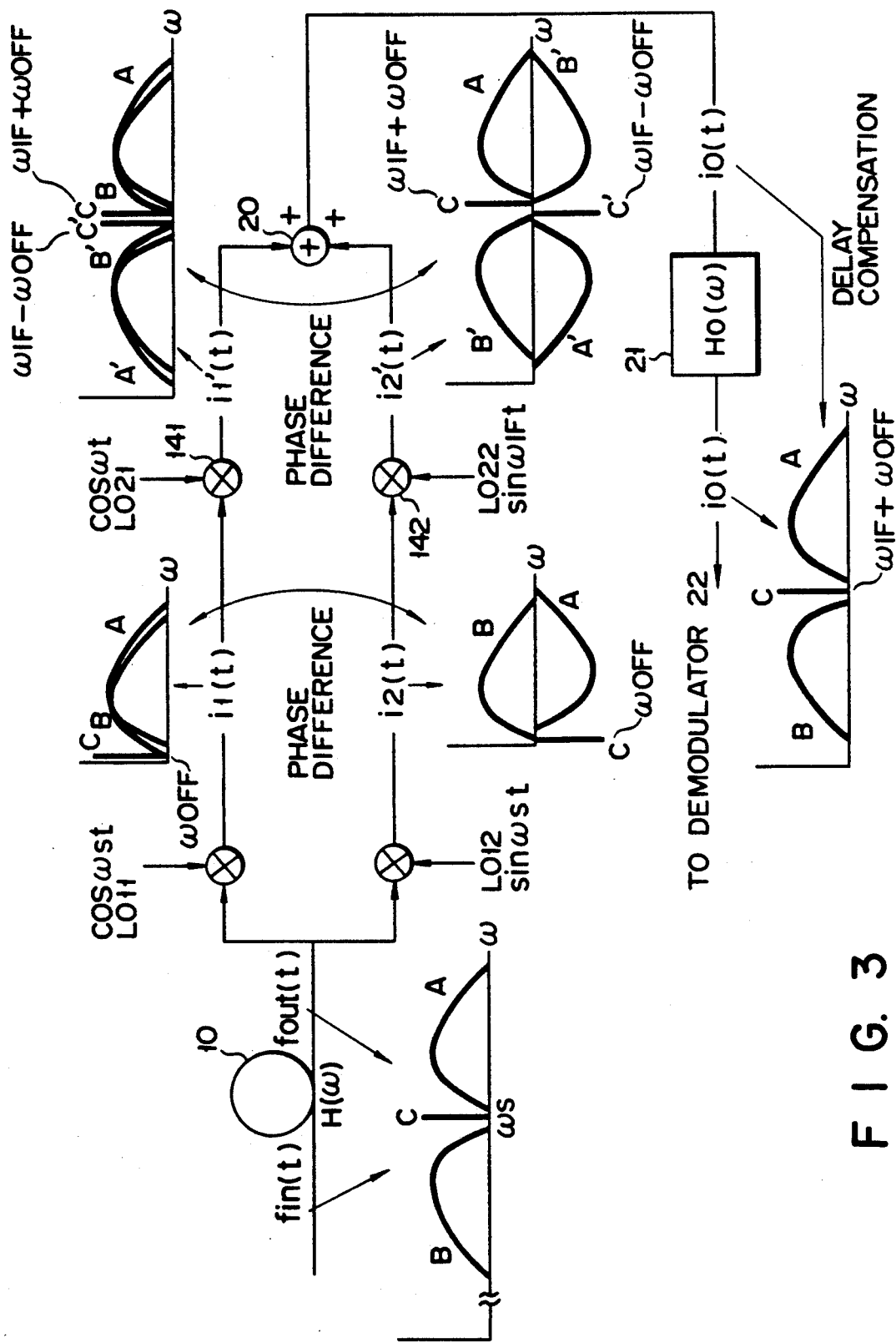
FIG. 3 is an equivalent circuit diagram for explaining the same embodiment.

FIG. 3 presents an equivalent circuit diagram for explaining the operation of equalization delay distortion compensation in this embodiment.

Signal light $f_{in}(t)$ input to the optical fiber 10 is expressed by:

$$f_{in}(t) = \int_0^\infty A(p) \cos\{(\omega_s + p)t + \psi + \theta(p)\} dp + \int_0^\infty B(p) \cos\{(\omega_s - p)t + \psi - \phi(p)\} dp + C \cos(\omega_s t + \psi) \quad (7)$$

In this equation, the third term represents a optical carrier, and the first and second terms an upper sideband and a lower sideband, respectively. Variables A(p), θ(p), B(p), and ψ(p) give the sideband waveforms and phases, A(p) and B(p) are illustrated in FIG. 3.

With the transfer function of the optical fiber 10 being H(ω) which is expressed by $$|H(\Psi)| = G(\omega), \arg H(\omega) = \Psi(\omega) \quad (8)$$

then signal light $f_{out}$ given by the following equation is at the output end of the optical fiber 10.

$$f_{out}(t) = \int_0^\infty G(\omega_s + p) A(p) \cos\{(\omega_s + p)t + \psi + \theta(p) + \Psi(\omega_s + p)\} dp + \int_\infty^0 G(\omega_s - p) B(p) \cos\{(\omega_s - p)t + \quad (9)$$

-continued
$$\psi - \phi(p) + \Psi(\omega_s - p)\} \, dp + CG(\omega_s) \cos \{\omega_s t + \psi + \Psi(\omega_s)\}$$

This signal light is supplied to the optical hybrid circuit 11 and is divided into two components, which result output currents $i_1(t)$ and $i_2(t)$ at photodiodes 121, 122. These currents are given by the following equations:

$$i_1(t)/S = \int_0^\omega G(\omega_s + p) A(p) \cos \{(p + \omega_{OFF})t + \psi + \theta(p) + \tag{10}$$

$$\Psi(\omega_s + p)\} \, dp + \int_0^W G(\omega_s - p) B(p) \cos \{(p - \omega_{OFF})t - \psi +$$

$$\phi(p) - \Psi(\omega_s - p)\} \, dp + CG(\omega_s) \cos \{\omega_{OFF} t + \psi + \Psi(\omega_s)\}$$

$$i_2(t)/S = - \int_0^W G(\omega_s + p) A(p) \sin \{(p + \omega_{OFF})t + \psi + \theta(p) + \tag{11}$$

$$\Psi(\omega_s + p)\} \, dp + \int_0^W G(\omega_s - p) B(p) \sin \{(p - \omega_{OFF})t - \psi +$$

$$\phi(p) - \Psi(\omega_s - p)\} \, dp - CG(\omega_s) \sin \{\omega_{OFF} t + \psi + \Psi(\omega_s)\}$$

where W is the band width of the detectors.

In the equation (10) the three terms have the same sign, while in the equation (11) only the second term has a different sign from the first and the third. This means that an in-phase sideband, even when folded over, has the sign unchanged whereas a quadrature-phase side wave band has the sign inverted.

$$a(t) = \int_0^\omega G(\omega_s + p) A(p) \cos \{(\omega_{IF} + p + \omega_{OFF})t + \tag{12}$$

$$\psi + \theta(p) \Psi(\omega_s + p)\} \, dp$$

$$a'(t) = \int_0^W G(\omega_s + p) A(p) \cos \{(\omega_{IF} - p - \omega_{OFF})t - \tag{13}$$

$$\psi - \theta(p) - \Psi(\omega_s + p)\} \, dp$$

$$b(t) = \int_0^W G(\omega_s - p) B(p) \cos \{(\omega_{IF} + p - \omega_{OFF})t - \tag{14}$$

$$\psi + \phi(p) + \Psi(\omega_s - p)\} \, dp$$

$$b'(t) = \int_0^W G(\omega_s - p) B(p) \cos \{(\omega_{IF} - p + \omega_{OFF})t + \tag{15}$$

$$\psi - \phi(p) + \Psi(\omega_s - p)\} \, dp$$

$$c(t) = CG(\omega_s) \cos \{(\omega_{IF} + \omega_{OFF})t + \psi + \Psi(\omega_s)\} \tag{16}$$

$$c'(t) = CG(\omega_s) \cos \{(\omega_{IF} - \omega_{OFF})t - \psi - \Psi(\omega_s)\} \tag{17}$$

then the outputs $i_1'(t)$ and $i_2'(t)$ of the mixers 141 and 142 can be expressed by the following equations:

$$i_1'(t)/S = a(t) + a'(t) + b(t) + b'(t) + c(t) + c'(t) \tag{18}$$

$$i_2'(t)/S = a(t) - a'(t) - b(t) - b'(t) - c(t) - c'(t) \tag{19}$$

These outputs $i_1'(t)$ and $i_2'(t)$ are supplied to the adder 20 for addition. The output $i_0$ of this adder 20 is expressed as follows:

$$i_0(t)/S = a(t) + b'(t) + c(t) \tag{20}$$

Accordingly, with the transfer function of the equalizer 21, $H_0(\omega)$, being given by $$H_0(\omega) \alpha H^{-1}(\omega + \omega_s - \omega_{IF} - \omega_{OFF}) \tag{21}$$

then, the delay of the optical fiber can be compensated for, as should be obvious from the equations (12), (15) and (16). Since $|H_0(\omega)|$ can be assumed to be constant, the following should only be satisfied:

$$|H_0(\omega)| = const \tag{22}$$

$$argH_0(\omega) = -argH(\omega) \tag{23}$$

Figure 4:
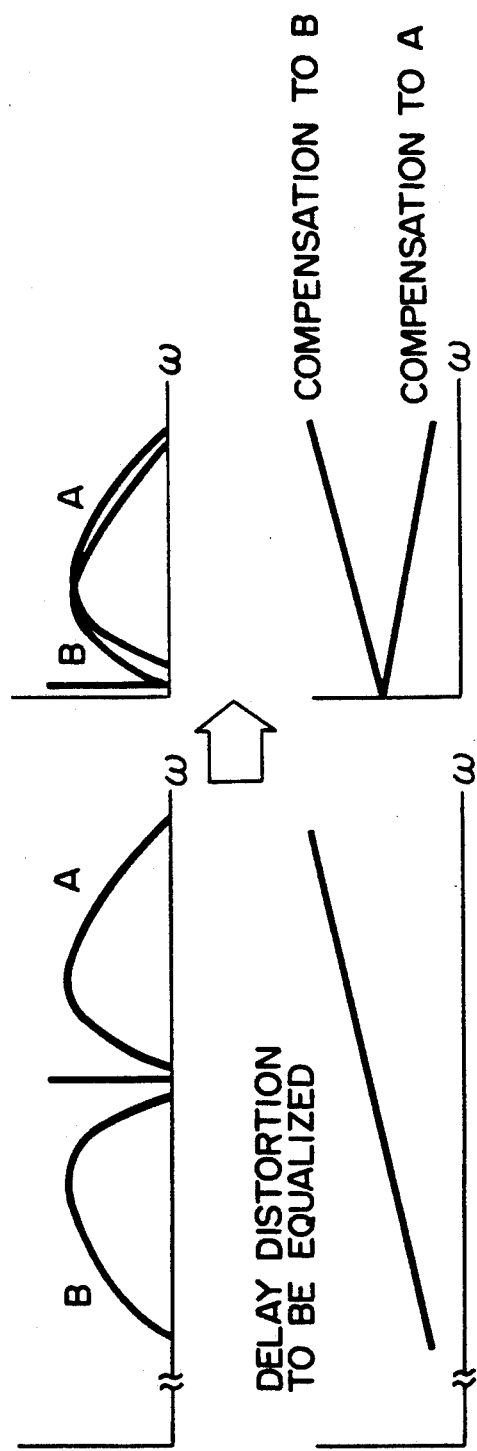
FIG. 4 is a diagram for explaining the effect of the same embodiment.

In other words, according to the homodyne receivers and conventional phase-diversity type receivers, as is illustrated in FIG. 4, the upper and lower side bands of a signal are folded in the baseband, which makes it impossible to compensate the delay of the optical fiber, whereas according to the double phase diversity receiver, the upper and lower side bands can be separated again when the base band signals are up-converted to the intermediate frequency band, and added, thus ensuring compensation for the delay distortion of the optical fiber as per the heterodyne scheme.

For a wavelength band (1.55 μm) of the abnormal dispersion region of silica optical fibers, the delay compensation can be effected by using as the equalizer 21 a medium having a flat amplitude characteristic and having a positive dispersion, such as a strip line. On the contrary for longer wavelength band (equal to or less than 1.3 μm) having the normal dispersion, the output $i_0$ of the adder 20 in the equation (20) should consist of $a'(t)$, $b(t)$ and $c'(t)$. This may be done by changing the connection of the local oscillator 18 or changing the polarity of one of the inputs to the adder 20.

In addition, arg H(ω) is inserted into the equations (9) to (17), the first term of arg H(ω) presents a uniform time delay and the second term represents the dispersion.

The reception scheme of such a double phase diversity receiver produces the effects as shown in the following table given in comparison with the results of other receiving schemes.

| Scheme Item | Direct Detection | Heterodyne | Homodyne | Phase Diversity | Double-Stage Phase-Diversity |
|---|---|---|---|---|---|
| Receiver Sensitivity | 10–25 dB lower than heterodyne system | 3 dB lower than homodyne system | Best | Same as heterodyne or slightly lower | Same as heterodyne |
| Required Detector Band | Half of the bit rate | 2 to 3 times of the bit rate | Half of the bit rate | Half of the bit rate | Half of the bit rate |

-continued

| Scheme Item | Direct Detection | Heterodyne | Homodyne | Phase Diversity | Double-Stage Phase-Diversity |
| --- | --- | --- | --- | --- | --- |
| Requirement for Width of Laser Spectral Line | Very loose | (1) Sync demodulation: Very severe but looser than homodyne system (2) Other cases: Very loose | Very severe | Same as (2) of heterodyne system | Same as heterodyne system |
| Possible Modulation Scheme | Only intensity modulation | All possible | All possible except FSK | All possible except FSK | All possible |
| Possible Demodulation Scheme | Direct baseband signal available | Sync and async demodulation possible for any modulation system | Baseband signal directly obtained | Self multiplier (square detector) for ASK Delay multiplier for PSK | Sync and async demodulation possible for any modulation system |
| Delay Equalization | Impossible | Possible | Impossible | Impossible | Possible |
| Other | | | | Same number of detectors and demodulators as ports required | Same number of only detectors as ports required |

Let us now check the effects of double-stage phase-diviersity scheme item by item.

(1) Reception Sensitivity

Since the double-stage phase-diversity receiving scheme divide signal light into more than two parts prior to detection, its reception sensitivity is lower than that of the idealistic homodyne scheme, but can be kept at substantially the same receiving sensitivity of the heterodyne scheme.

(2) Required Detector Band

Similar to the homodyne scheme and phase diversity scheme, the optical current after detection is in the baseband, and the required detector band can be half the bit rate from the Shannon's theorem.

(3) Requirement for Width of Laser Spectral Line

The requirement for the width of the laser spectral line is determined by the demodulation scheme, not the detection scheme. The requirement is very severe for the homodyne scheme in which detection and demodulation are unified. Since the double-stage phase diversity receiving scheme employs the heterodyne demodulation, however, the requirement is the exactly the same as that of the heterodyne scheme.

(4) Modulation Scheme

Due to the use of the heterodyne modulation, the double-stage phase-diversity receiving scheme can deal with all of ASK, FSK (Frequency Shift Keying) and PSK.

(5) Demodulation Scheme

Since the double-stage phase-diversity receiving scheme employs the heterodyne demodulation, it can use the same demodulator as the heterodyne scheme. In addition, according to the double-stage phase-diversity reception scheme, the intermediate frequency is not restricted by the band of the detector, so that this scheme can also employ a PSK synchronous demodulation whose use is difficult in the heterodyne scheme.

(6) Delay Equalization

This can be done in the same manner as done in the heterodyne scheme.

(7) Other

The phase diversity scheme requires the same number of detectors and demodulators as the number of ports, whereas the double-stage phase-diversity receiving scheme requires only one demodulator and the same number of detectors as that of the ports.

Figure 5:
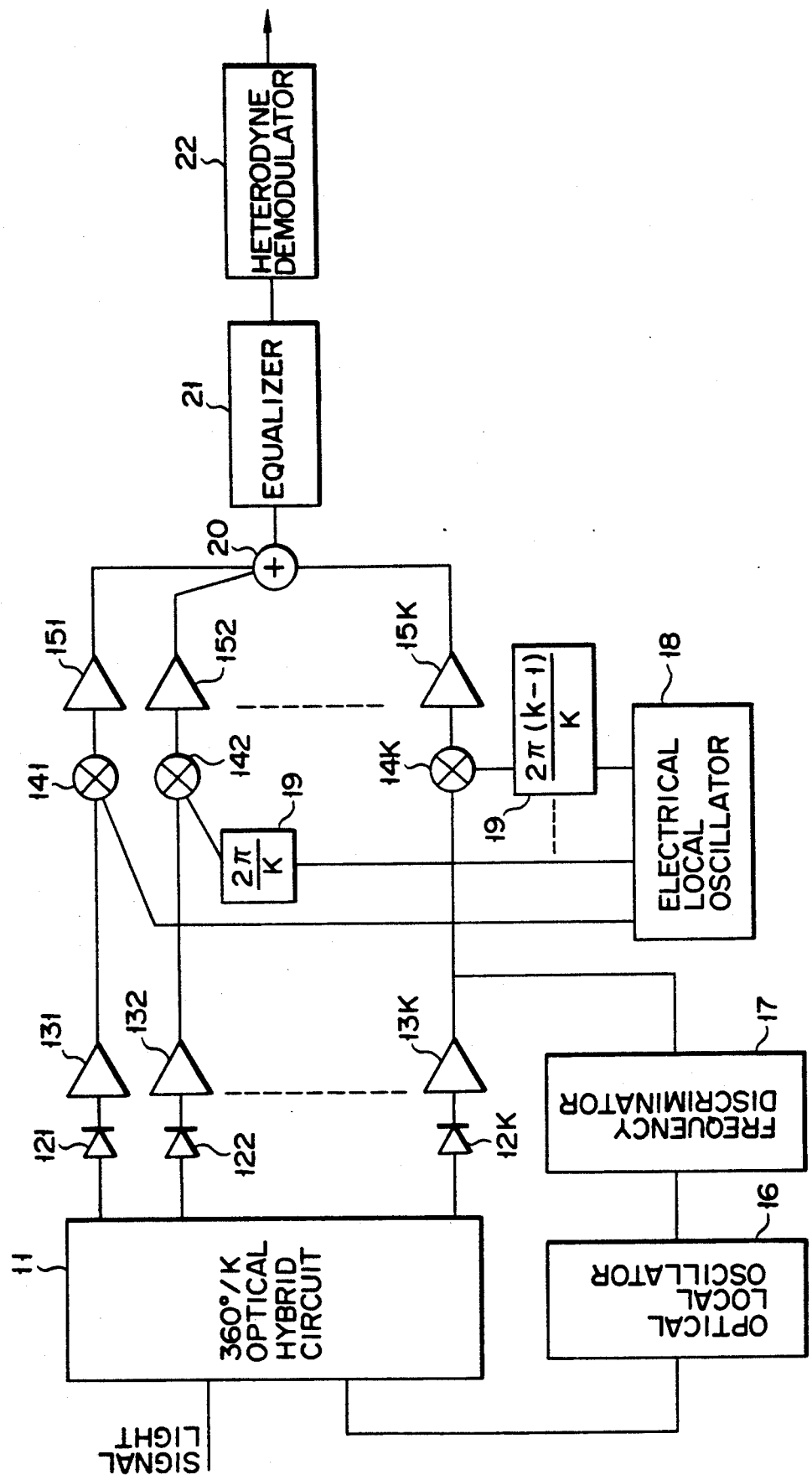
FIG. 5 is a block diagram of a double-stage phase-diversity receiver according to the second embodiment of this invention.

FIG. 5 illustrates the second embodiment of the present invention, which is a multi-port (K ports) double phase diversity reception scheme.

An optical hybrid circuit 11 has K output ports to which a circuit of a photodiode 121, amplifier 131 and mixer 141, a circuit of a photodiode 122, amplifier 132 and mixer 142, ... , and a circuit of a photodiode 12K, amplifier 13K and mixer 14K are respectively connected. Mixers 141, 142, ... and 14K receive a electrical local oscillation signal having a phase difference of $2\pi(K-1)/K$ via a phase shifter 19 from an electrical local oscillator 18. The outputs of these mixers 141, 142, ... , and 14K are supplied respectively through amplifiers 151, 152, ... and 15K for addition. Since the other circuit arrangement is the same as the one shown in FIG. 2, the same reference numerals as used to specify the identical or corresponding elements in the second embodiment, thus omitting their description.

In this case, with $K \geq 3$, the first-stage local oscillation signal and second-stage local oscillation signal given to the k-th port are $\cos(\omega_s' + 2\pi k/K)$ and $\cos$ ($\omega_{IF}t + 2\pi k/K$), the light current $i_K(t)$ acquired through the optical hybrid circuit 11 becomes $$i_K(t) \alpha V(t) \cos(\omega_{OFF}t + \psi - 2\pi k/K) \quad (24)$$

and the current $i_K'(t)$ given by the individual mixers 141−14K becomes $$i_K'(t) \propto V(t) \cos\{(\omega_{IF} + \omega_{OFF})t + \psi\} + \quad (25)$$
$$V(t) \cos\{(\omega_{IF} - \omega_{OFF})t + \psi + 4\pi k/K\}$$

This yields the output $i_O(t)$ of the adder 20 expressed as $$i_O(t) \alpha K v(t) \cos\{(\omega_{IF} + \omega_{OFF})t + \psi\} \quad (26)$$

The results are the same as those obtained by the aforementioned.

Figure 6:
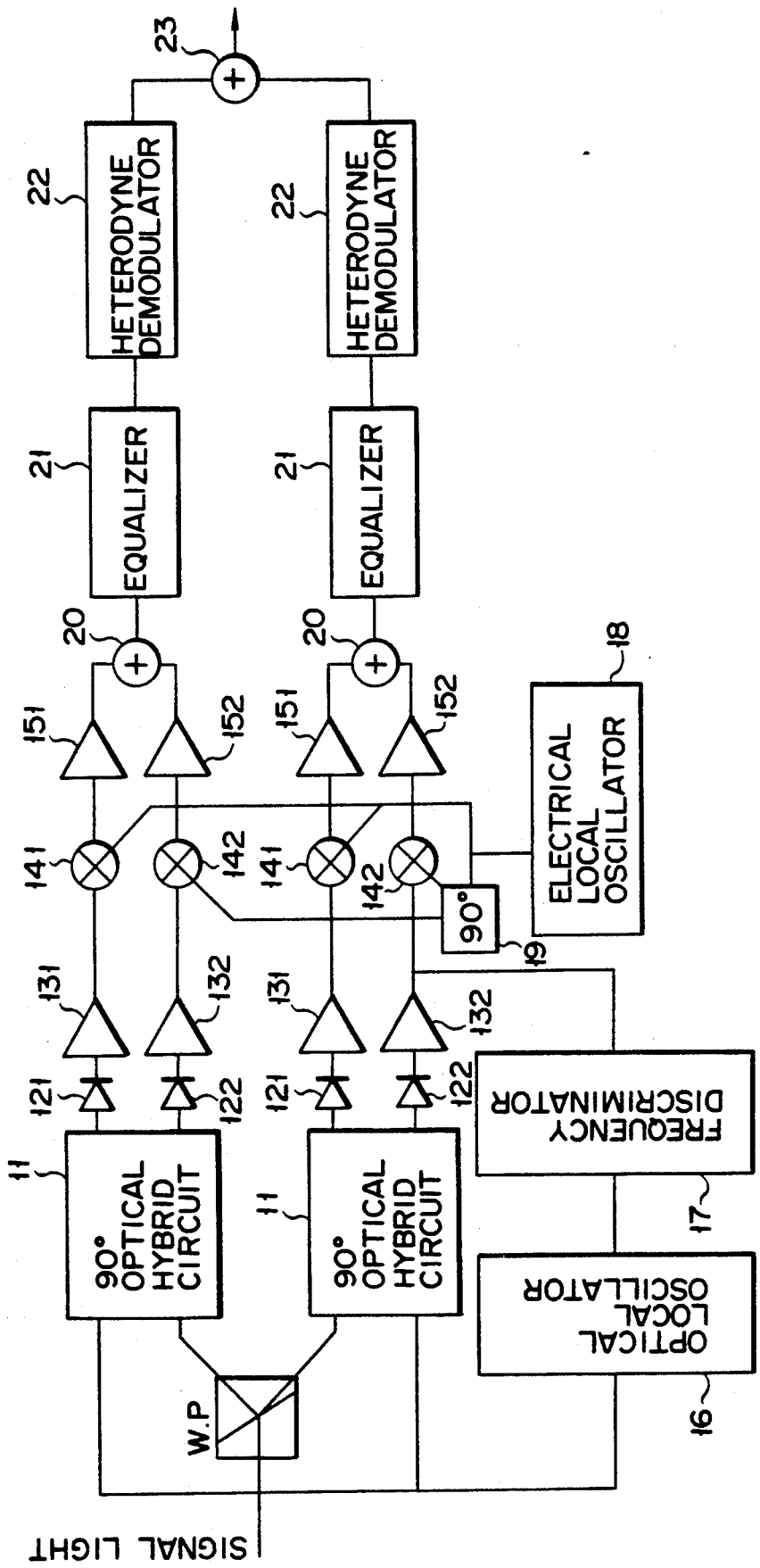
FIG. 6 is a block diagram of a double-stage phase-diversity receiver according to the third embodiment of this invention.

FIG. 6 illustrates the third embodiment of this invention.

This embodiment is a combination of a polarization diversity and a double-stage phase-diversity receiver provided for each of two orthogonal polarizations propagated through the optical fiber. In this case, the individual double phase diversity outputs after undergoing demodulation in demodulators 22 are added together by an adder 23, which in turn outputs the added result. Since the other circuit arrangement is the same as the one shown in FIG. 2, the same reference numerals as used to specify the identical or corresponding elements in the second embodiment, thus omitting their description.

Although the foregoing descriptions of the individual embodiments have been given mainly with reference to coherent optical fiber communications, the present invention can be widely applied to optical communications involving spatial propagation as well as electrical communications, radio-wave communications, radars, general instrumentation technology and the like which use electrical signals of a long wave, medium wave, short wave, ultrashort wave, millimetric wave, submillimetric wave, etc.

Figure 7:
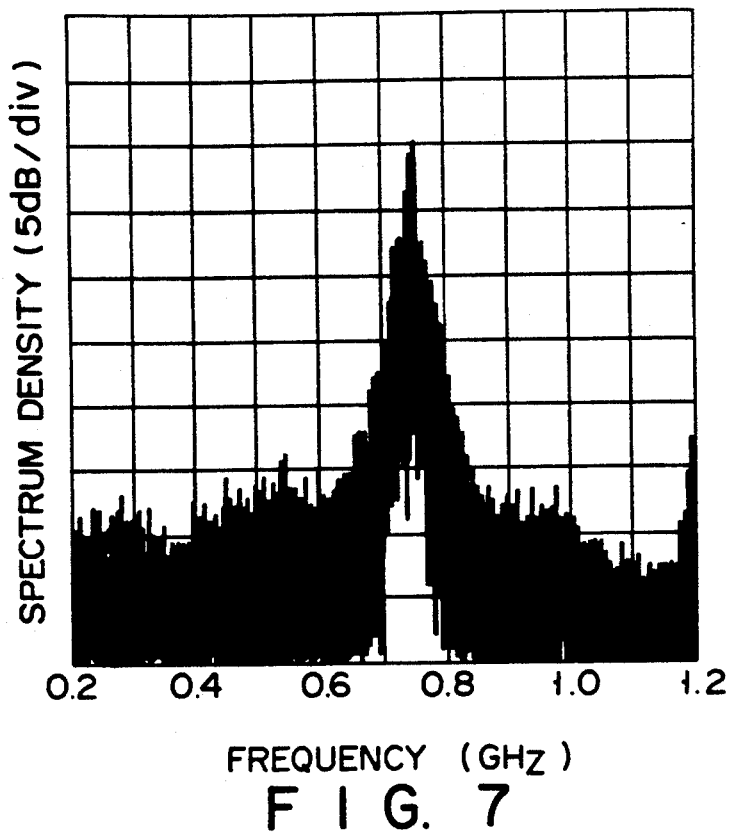
FIG. 7 is an experimental result in a double-stage phase-diversity optical receiver according to the first embodiment and shows the power spectrum of the added up-converted intermediate frequency signals under no modulation.
Figure 8:
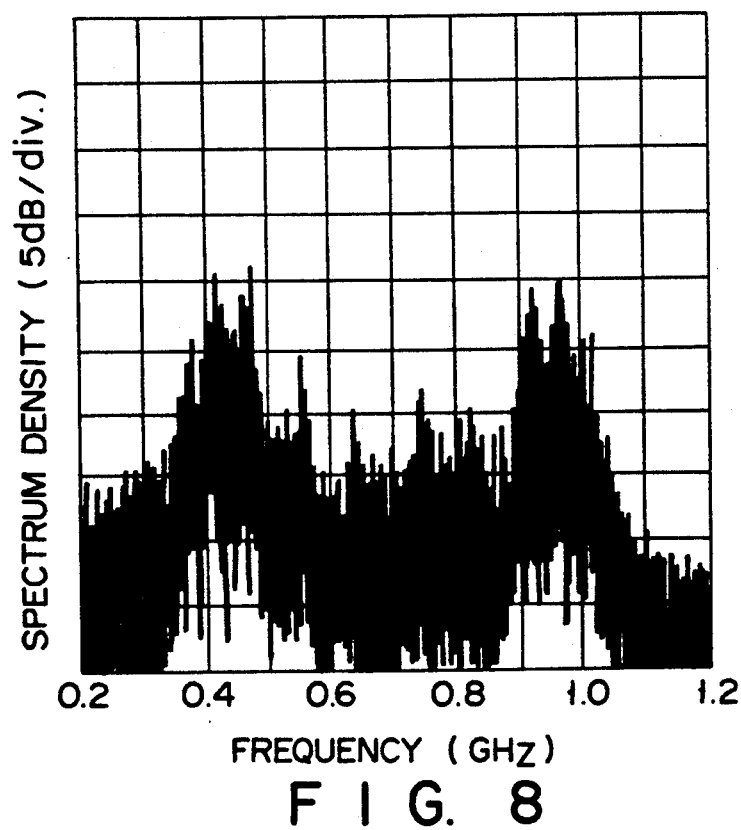
FIG. 8 is another experimental result and shows the power spectrum of the added up-converted intermediate frequency signals under FSK modulation.
Figure 9:
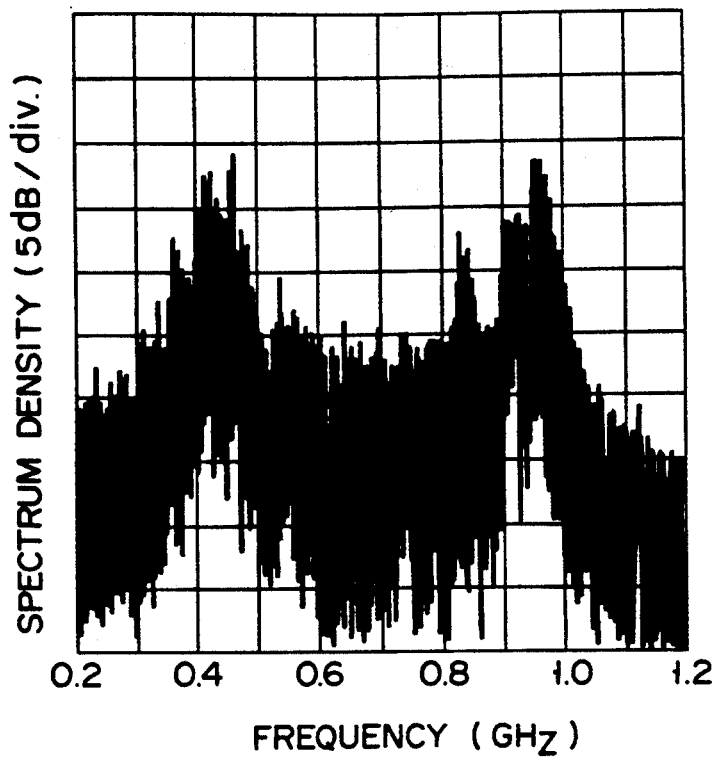
FIG. 9 is another experimental result and shows the power spectrum of the heterodyne demodulated intermediate frequency signals under FSK modulation.
Figure 10:
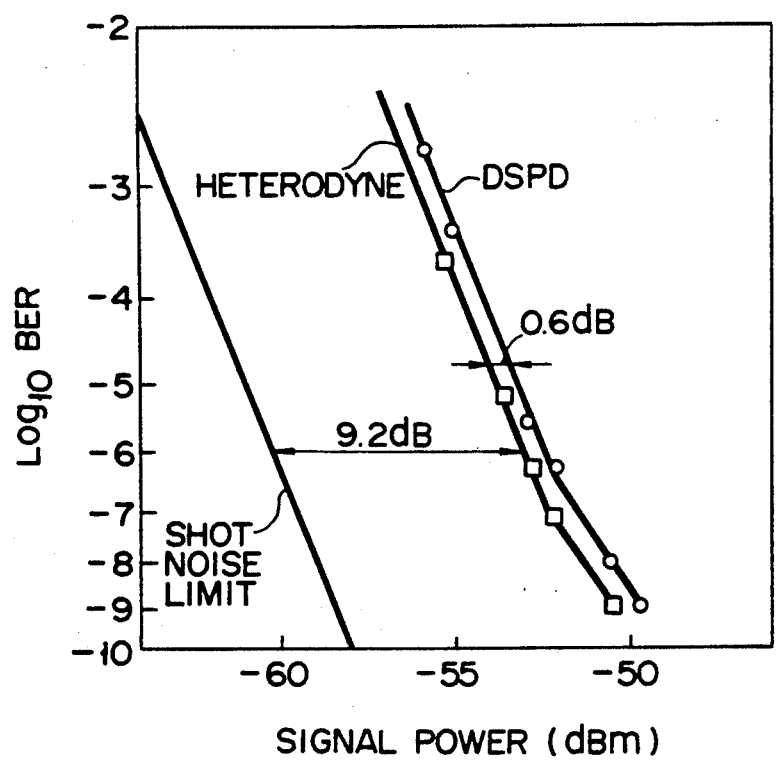
FIG. 10 is another experimental result and shows the measured bit error rate as a function of received signal optical power.

Utilizing the setup shown in FIG. 2, an experiment is carried out. An FSK modulated optical data signal of 100 Mbit/s one-zero pattern with a frequency deviation of about 600 MHz is generated as output optical signal in a DFB semiconductor laser with a narrow linewidth of 10 MHz in 1.30 μm wavelength range by injecting electrical current pattern corresponding electrical data signal. The optical signal is fed into a 90° optical hybrid as shown by 101 in FIG. 2, through signal mode optical fiber, and local oscillator optical signal is fed into the hybrid as shown by 102 in FIG. 2. The local optical oscillator signal is generated in the same type of semiconductor laser with almost same electrooptical performances as that for the data signal. Both lasers are temperature-controlled to ±0.01° K. and the frequency of the local oscillator is adjusted near the center frequency of the modulated signal FSK spectrum. Isolators are inserted in front of the two lasers. An ND filter is inserted in the signal path to simulate a fiber. The 90° degree optical hybrid consists of a λ/4-plate and polarization beam splitter (PBS). The front-end is a phase-diversity receiver using InGaAs PIN photodetectors and high-impedance-type baseband amplifiers. The local oscillator power measured at the photodetector surface is −3 dBm. In the second-stage phase-diversity frequency up-conversion, the baseband signals are up-converted to 650 MHz (central frequency) using two double-balanced mixers. The two up-converted intermediate frequency signals are added by means of a resistive combiner, and fed to a conventional FSK heterodyne signal-filter demodulator consisting of a band-pass filter (center: 1 GHz, bandwidth: 400 MHz), an envelope demodulator, and a low-pass filter (bandwidth: 50 MHz). FIG. 7 shows the signal power spectrum of the added upconverted intermediate frequency with no modulation. The offset frequency (the difference between the optical signal and local oscillator frequencies) is set to be 100 MHz. The unwanted signal which would appear at 550 MHz, if the cancellation is not complete, is found to be suppressed at least 20 dB below the signal at 750 MHz, demonstrating that the double-stage phase-diversity (DSPD) scheme is functioning as expected. The pure line spectrum at 650 MHz shows the spuriously coupled local oscillator signal; this can eventually be eliminated afterwards because it is outside the pass band of the band pass filter. FIG. 8 shows the signal power spectrum of the added upconverted intermediate frequency under FSK modulation. This spectrum is found to be identical to that in a conventional signal-port heterodyne receiver using the same system, and shown in FIG. 9. The measured bit-error rate (BER) is shown in FIG. 10 as a function of the sum of the received optical powers detected by two photodetectors in the two branches. The BER of the heterodyne receiver is also measured and shown for comparison in FIG. 10. Theoretically, the sensitivities of double stage phase-diversity and heterodyne schemes are equal, whereas 0.6 dB degradation is observed. This degradation is most probably due to imperfect phase and amplitude match between the two branches.

A radio-frequency experiment is also performed. An 1 MHz carrier is modulated by a 12 kHz signal having a triangular waveform, and received by a double-stage phase-diversity receiver. The receiver has a first-stage oscillator frequency of 0.996 MHz and the mixed signals are fed into low pass filters with a cutoff frequency of 160 kHz and are up-converted to intermediate frequency signals using second-stage local oscillator signals of 0.996 MHz. These intermediate frequency signals are added.

FIG. 11 shows the power spectrum of the added intermediate frequency (IF) signals. The upper and lower sidebands are clearly separated, and the obtained signal is nothing but what would be obtained as the intermediate frequency signal in an ordinary heterodyne receiver.

What is claimed is:

1. A double-stage phase diversity receiver comprising:
   an optical fiber, through which an optical signal is transmitted and which has a predetermined propagation function;
   signal dividing means for dividing the optical signal transmitted through said optical fiber into a plurality of divided optical signals;
   a first-stage local oscillator signal generating means for generating a plurality of optical first-stage local oscillator signals each having a predetermined phase difference with respect to another of said first-stage local oscillator signals;
   signal mixing means for mixing each of said plurality of first-stage local oscillator signals with a respective one of said plurality of divided optical signals to generate a plurality of electrical signals;

second-stage local oscillator signal generating means for generating a plurality of electrical second-stage local oscillator signals each having a predetermined phase difference with respect to another of said electrical second stage local oscillator signals;

up-converting means for multiplying each of said plurality of electrical signals by a respective one of said plurality of electrical second-stage local oscillator signals to generate a plurality of up-converted signals;

adding means for adding said plurality of up-converted signals to generate an output signal;

equalizing means for compensating for a distortion due to delay in the optical signal transmitted through said optical fiber and contained in the output signal of said adding means, so as to provide an equalized output signal, said equalizing means having a characteristic $H_o(\omega)$ which is expressed by $$|H_o(\omega)| = \text{a constant}$$

$$\arg H_o(\omega) = -\arg H(\omega)$$

when the propagation function of said optical fiber is $H(\omega)$; and heterodyne demodulation means for demodulating said equalized output signal.

2. A double-stage phase-diversity receiver according to claim 1, wherein said signal mixing means comprises an optical hybrid circuit.

3. A double-stage phase-diversity receiver according to claim 1, wherein said signal mixing means comprises an optical hybrid circuit.

4. A double-stage phase-diversity receiver comprising:

an optical fiber, through which an optical signal is transmitted and which has a predetermined propagation function;

signal dividing means for dividing the optical signal transmitted through said optical fiber into two divided optical signals;

first-stage local oscillator signal generating means for generating two optical first-stage local oscillator signals having a phase difference of 90° with respect to each other;

signal mixing means for mixing each of said two optical first-stage local oscillator signals with a respective one of said two divided optical signals to generate two electrical signals;

second-stage local oscillator signal generating means for generating two optical second-stage local oscillator signals having a phase difference of 90° with respect to each other;

up-converting means for multiplying each of said two electrical signals by a respective one of said two electrical second-stage local oscillator signals to generate two up-converted signals;

adding means for adding said two up-converted signals to generate an output signal;

equalizing means for compensating for a distortion due to delay in the optical signal transmitted through said optical fiber and contained in the output signal of said adding means, so as to provide an equalized output signal, said equalizing means having a characteristic $H_o(\omega)$ which is expressed by $$|H_o(\omega)| = \text{a constant}$$

$$\arg H_o(\omega) = -\arg H(\omega)$$

when the propagation function of said optical fiber is $H(\omega)$; and heterodyne demodulation means for demodulating said equalized output signal.

5. A double-stage phase-diversity receiver apparatus comprising:

at least two parallel-connected double-stage phase diversity receivers coupled to an optical fiber through which an optical signal is transmitted and which ha a predetermined propagation function, each of said at least two double-stage phase-diversity receivers including:

signal dividing means for dividing an optical signal transmitted through said optical fiber into two divided optical signals;

first-stage local oscillator signal generating means for generating two optical first-stage local oscillator signals having a phase difference of 90° with respect to each other;

signal mixing means for mixing each of said two optical first-stage local oscillator signals with a respective one of said two divided optical signals to generate two electrical signals;

second-stage local oscillator signal generating means for generating two electrical second-stage local oscillator signals having a phase difference of 90° with respect to each other;

up-converting means for multiplying each of said two electrical signals by a respective one of said two electrical second-stage local oscillator signals to generate two up-converted signals;

adding means for adding said two up-converted signals to generate an output signal;

equalizing means for compensating for a distortion due to delay in the optical signal transmitted through said optical fiber and contained in the output signal of said adding means, so as to provide an equalized output signal, said equalizing means having a characteristic $H_o(\omega)$ which is expressed by $$|H_o(\omega)| = \text{a constant}$$

$$\arg H_o(\omega) = -\arg H(\omega)$$

when the propagation function of said optical fiber is $H(\omega)$; and heterodyne demodulation means for demodulating said equalized output signal.

6. A double-stage phase-diversity receiver apparatus according to claim 5, further comprising means for adding demodulated outputs from a plurality of heterodyne demodulation means of said at least two double-stage phase-diversity receivers.

* * * * *